United States Patent [19]

Vaidyanathan et al.

[11] Patent Number: 4,567,017
[45] Date of Patent: Jan. 28, 1986

[54] FUEL PIN CLADDING

[75] Inventors: Swaminathan Vaidyanathan, San Jose; Martyn G. Adamson, Danville, both of Calif.

[73] Assignee: The United States of America as represented by the United States Department of Energy, Washington, D.C.

[21] Appl. No.: 562,146

[22] Filed: Dec. 16, 1983

[51] Int. Cl.$^4$ .............................................. G21C 3/00
[52] U.S. Cl. .................................. 376/417; 376/414; 376/416; 376/418
[58] Field of Search ................ 376/417, 416, 414, 418

[56] References Cited

U.S. PATENT DOCUMENTS 4,229,260  10/1980  Johnson ............................. 376/417

FOREIGN PATENT DOCUMENTS 5422098  7/1977  Japan ................................. 376/417

Primary Examiner—Donald P. Walsh
Attorney, Agent, or Firm—L. E. Carnahan; Roger S. Gaither; Judson R. Hightower

[57] ABSTRACT

An improved fuel pin cladding, particularly adapted for use in breeder reactors, consisting of composite tubing with austenitic steel on the outer portion of the thickness of the tube wall and with nickel and/or ferritic material on the inner portion of the thickness of the tube wall. The nickel forms a sacrificial barrier as it reacts with certain fission products thereby reducing fission product activity at the austenitic steel interface. The ferritic material forms a preventive barrier for the austenitic steel as it is immune to liquid metal embrittlement. The improved cladding permits the use of high density fuel which in turn leads to a better breeding ratio in breeder reactors, and will increase the threshold at which failure occurs during temperature transients.

16 Claims, 2 Drawing Figures

FUEL PIN CLADDING

BACKGROUND OF THE INVENTION

The invention described herein arose in the course of, or under, Contract No. DE-AT03-76SF71031 between the U.S. Department of Energy and the General Electric Company.

The invention relates to fuel pin cladding, particularly to a composite fuel pin cladding for preventing loss of integrity of the outer cladding material by containment therein of fission products, and more particularly to a composite fuel pin cladding utilizing at least a layer of nickel and/or ferritic materials within tubing of austenitic material.

Over the years, substantial effort has been directed to providing fuel pin cladding material which can withstand the fission generated gases and the temperatures involved in the fission process. These efforts have included the use of various types of cladding materials and different approaches to preventing the loss of structural integrity of the cladding material by use of various types of barriers. These prior efforts are exemplified by U.S. Pat. Nos. 3,625,821 issued Dec. 7, 1971 to H. E. Ricks; 4,022,662 issued May 10, 1977 to G. M. Gordon et al; 3,086,893 issued May 7, 1963 to C. N. Spalaris; 3,354,043 issued Nov. 21, 1967 to A. Boettcher; and 3,384,551 issued May 21, 1968 to H. Kornbichler.

With the development of the liquid metal fast breeder reactors, the primary choice for fuel pin cladding material has long been the American Iron & Steel Institute (AISI) Type-300 series of iron-base austenitic stainless steels. In particular, 20% cold-worked Type 316 stainless steel, or a modification thereof, has been the reference material for fuel pin cladding both in the United States and abroad. This cladding material has long been known to undergo a form of slow fission product-assisted oxidation by oxide fuel, called fuel-cladding chemical interaction (FCCI) which forms a corrosion layer. As the result of extensive out-of-pile testing it was initially believed that the remaining cladding wall thickness does not suffer any significant degradation of mechanical properties due to the presence of fission products in the corrosion layer. These out-of-pile investigations included attempts to identify mechanisms such as stress-assisted FCCI and/or cladding embrittlement as a result of prolonged contact with (simulated) fission products. It was later recognized that there was the possible existence of some stress-assisted grain boundary weakening mechanism involving certain fission products.

The fuel pin cladding constitutes the first level of containment of radioactive products and its integrity is therefore of major importance to the design of the reactor. The loading on the austenitic stainless steel cladding is primarily due to two sources: (1) the fission gas pressure, and (2) the fuel-cladding mechanical interaction resulting from fuel swelling. Premature failure of the fuel pin cladding has been noted under certain conditions, particularly with high density fuel or under temperature transient conditions. Recent tests have conclusively established that failure of the austenitic cladding could result from liquid embrittlement induced by the presence of a mixture of cesium and tellurium fission products. Both solid solution autenitic alloys, such as the above-mentioned U.S. reference alloy 20% cold worked AISI 316 stainless steel, as well as precipitation hardenable alloys were found to be susceptible to this type of embrittlement. For more detailed information relative to the above-mentioned recent tests see Report GEFR-00567, "Laboratory Study On The Effects of Simulated Fission Products On Cladding Mechanical Behavior: Evidence For Liquid Metal Embrittlement of Austenitic Alloys By Cs-Te Mixtures", by M. G. Adamson et al, dated July 1981.

Further tests, as set forth in Report GEFR-00567, have also demonstrated that ferritic alloys are immune to this type of embrittlement. However, the use of ferritic cladding leads to lower operating temperatures with an attendant penalty on the thermal efficiency as ferritics in general do not possess sufficient high temperature strength. In addition, the use of austenitic stainless steel cladding for large liquid metal fast breeder reactors has been under development for more than a decade and the qualification of ferritic cladding might lead to increased research and development costs.

Thus, a need has existed for a fuel pin cladding which provides the high temperature strength of austenitic stainless steel but which is not affected by liquid metal embrittlement.

SUMMARY OF THE INVENTION

It is an object of the present invention to provide an improved nuclear fuel pin cladding, particularly adapted for use in liquid metal breeder reactors.

A further object of the invention is to provide an improved fuel pin cladding which is not subject to liquid metal embrittlement, but which permits the use of high density fuel therein.

Another object of the invention is to provide an improved fuel pin cladding which possess sufficeint high temperature strength for use in liquid metal fast breeder reactors, while not being susceptible to liquid metal embrittlement, whereby a high density fuel can be used which in turn leads to a better breeding ratio in breeder reactors Another object of the invention is to provide a composite fuel pin cladding for application in fuel pins for breeder reactors which provides the strength of austenitic stainless steel, while providing the immunity to liquid metal embrittlement of ferritic alloys.

These and other objects of the invention will become readily apparent from the following description and accompanying drawings. The above objects of the invention are basically accomplished by an improved composite fuel pin cladding which utilizes an outer layer or thickness of austenitic stainless steel and at least one inner layer of material which provides a barrier against embrittlement of the stainless steel by the fission products cesium and tellurium. The inner barrier layer may be composed of nickel or a ferritic material, such as iron, or composed of separate layers of nickel or nickel-iron alloy and ferritic material. As pointed out above, the ferritic material forms a preventive barrier as it is immune to liquid metal embrittlement. The nickel layer forms a sacrificial barrier as it preferentially reacts with tellurium thereby lowering the tellurium activity at the austenitic stainless steel interface or inner surface.

The improved cladding provides the necessary high temperature strength but prevents the liquid metal embrittlement mode of failure from the fission products cesium and tellurium, while permitting the use of high density fuel which in turn lead to a better breeding ratio in breeder reactors. The improved cladding also increases the threshold at which failure occurs during temperature transients.

DETAILED DESCRIPTION OF THE INVENTION

The present invention is an improved fuel pin cladding which includes means for: (1) preventing the liquid metal embrittlement mode of failure from the fission products cesium and tellurium, (2) permitting the use of high density fuel which in turn leads to a better breeding ratio in liquid metal fast breeder reactors, and (3) increasing the threshold at which failure occurs during temperature transients.

The invention constitutes an improved nuclear fuel pin cladding consisting of composite tubing or tubing layers wherein the outer portion of the tubing is made of austenitic stainless steel. The inner portion of the tubing consists of a different material which forms a barrier to the fission products (particularly cesium and tellurium) that cause liquid metal embrittlement. This inner portion can be made of nickel or ferritic material, or can be made from layers of ferritic and nickel material. The nickel forms a sacrificial barrier as it preferentially reacts with tellurium thereby preventing reaction thereof with the austenitic material. The ferritic material forms a preventive barrier as it is immune to liquid metal embrittlement.

Figure 1:
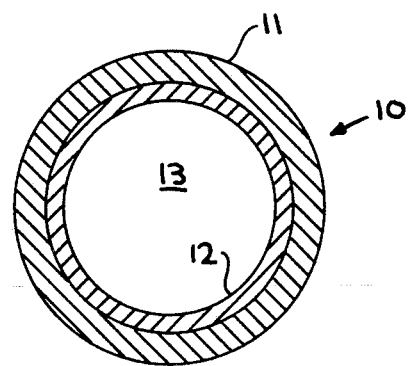
FIG. 1 is a cross-sectional view of an embodiment of a fuel pin cladding made in accordance with the present invention and utilizing a single inner barrier layer.

The improved nuclear fuel pin cladding consists of composite tubing as shown in the FIG. 1 embodiment, for example, where the composite tubing indicated generally at 10 includes an outer portion or thickness of the tubing, as indicated at 11, and an inner portion or thickness, as indicated at 12. The outer portion 11 of tubing 10 is made of austentitic stainless steel, such as the above-mentioned U.S. reference alloy 20% cold worked AISI 316 stainless steel. Other types of austenitic stainless steel may be used in the outer portion 11 of tubing 10. The inner portion 12 of tubing 10 may be made of nickel or nickel-iron alloy, or ferritic material such as iron and AISI 400 series alloys, or layers of nickel and ferritic material. The nuclear fuel is located within inner portion 12, as indicated at 13. The tubing 10 of FIG. 1 may be constructed such that the outer portion 11 constitutes a tube of austenitic stainless steel and the inner portion 12 constitutes a tube of nickel or ferritic material, or layers of these materials, with tube 12 being snugly fit within tube 11. Also, the tubing 10 can be formed by plating or depositing the material forming inner portion 12 onto the inner surface of the outer portion 11, or by coextrusion.

By way of example, with the tubing 10 having an inner diameter of 0.200" and an outer diameter of 0.240", the outer portion 11 would have a thickness of 0.015", and the inner portion 12 would have a thickness of 0.005".

Figure 2:
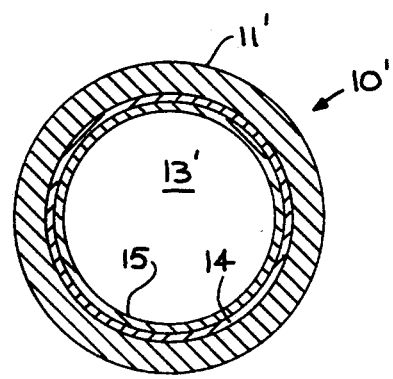
FIG. 2 is a cross-sectional view of another embodiment of the invention, but which utilizes a plurality of inner barrier layers.

The FIG. 2 embodiment differs from that of FIG. 1 primarily in the use of two layers or tubes of barrier material located within a layer or tube of austenitic stainless steel, with each layer of barrier material being made of a different material. As shown in FIG. 2 the improved fuel pin cladding of this emoodiment constitues composite tubing 10' which consists of an outer tube or layer 11' of austenitic stainless steel and two inner layers or concentric tubes 14 and 15 of barrier forming material. For example, intermediate layer or tube 14 may be composed of ferritic material, such as exemplified above, and innermost layer or tube 15 may be composed of nickel or nickel-iron alloy. Fuel, indicated at 13, is contained within layer or tube 15. The layers 15 and 14 providing sacrificial and preventive barriers which protect the austenitic stainless steel in layer 11' from liquid metal embrittlement caused by fission products, particularly a mixture of cesium and tellurium. It is understood that the material of layers or tubes 14 and 15 can be interchanged, if desired. In this case the nickel serves as a transition layer, to improve bonding between the ferritic and austenitic tubes.

By way of example, tubing 10' may consist of a layer or tube 11' having an outer diameter of 0.240" with a thickness of 0.015", layer or tube 14 of ferritic material having a thickness of 0.004", and layer or tube 15 of nickel having a thickness of 0.001", such that tubing 10" has an inner diameter of 0.200", and an overall wall thickness of 0.020". The layers 14 and 15 can be sequentially plated or deposited onto the inner surface of layer 11', or may constitute tubes made of the desired material which are snugly fit into one another to form the composite tubing 10', thus forming the improved fuel pin cladding.

While specific examples of the material thickness and diameters have been set forth the austenitic stainless steel tube may have an outer diameter of 0.230" to 0.290" and a wall thickness of 0.007" to 0.021". Wherein the layer or layers of barrier material may have a wall thickness of 0.001" to 0.008" and an inner diameter of 0.200" to 0.250". For example, in the FIG. 2 embodiment, the inner layer 15 of nickel may have a wall thickness of 0.001" to 0.003", with the intermediate layer 14 of ferritic material having a wall thickness of 0.005" to 0.008", while in the FIG. 1 embodiment the barrier layer 12 may have a 0.006" to 0.008" wall thickness.

It has thus been shown that the present invention provides means for preventing failure of fuel pin cladding which results from liquid metal embrittlement induced by the presence of a mixture of cesium and tellurium. By the incorporation of the liquid metal embrittlement prevention means of this invention into a fuel pin cladding using austenitic stainless steel for high temperature strength, high density fuel can be used which increases the breeding ratio of fast breeder reactors. Further by use of the present invention as cladding for fuel pins in liquid metal fast breeder reactors, the threshold at which failure occurs during temperature transients is increased.

While specific embodiments and materials have been illustrated or described, modifications and changes will become apparent to those skilled in the art, and it is intended to cover in the appended claims all such modifications and changes that come within the scope of this invention.

We claim:

1. In a fuel pin containing high density fuel for a breeder reactor, the improvement comprising: means for preventing liquid metal embrittlement of austenitic stainless steel fuel pin cladding induced by the presence of a mixture of cesium and tellurium fission products, said means consisting of at least one layer of barrier material positioned adjacent an inner surface of said cladding and selected from the group consisting of nickel and ferritic material.

2. The improvement of claim 1, wherein said layer of barrier material consists of nickel.

3. The improvement of claim 1, wherein said layer of barrier material consists of ferritic material seclected from the group consisting of iron and AISI 400 series alloys.

4. The improvement of claim 1, wherein said means consists of two concentric layers of barrier material, a first of said two layers being composed of nickel and a second of said two layers being composed of ferritic material.

5. The improvement of claim 4, wherein said layer of ferritic material is located intermediate said austenitic stainless steel and said layer of nickel.

6. A composite fuel pin cladding for liquid metal fast breeder reactors which includes means for substantially eliminating liquid metal embrittlement induced by the presence of a mixture of cesium and tellurium fission products, said composite cladding consisting of:
an outer layer of austenitic stainless steel, and
at least one layer of barrier material positioned within and adjacent to said austenitic stainless steel which constitutes said means, said layer of barrier material being selected from the group consisting of nickel, ferritic material, and layers of nickel and ferritic material.

7. The composite fuel pin of claim 6, wherein said means comprises two concentric layers of barrier material, one layer being composed of nickel, and the other layer being composed of ferritic material selected from the group consisting of iron and AISI 400 series alloys, said layer of nickel formings a sacrificial barrier as it reacts with tellurium thereby lowering the tellurium reaction activity with the stainless steel, and said layer of ferritic material forming a preventive barrier as it is immune to liquid metal embrittlement caused by the presence of a mixture of cesium and tellurium.

8. The composite fuel pin of claim 7, wherein said layer of austenitic stainless steel has a wall thickness of about 0.007" to 0.021", wherein said layer of nickel has a wall thickness of about 0.001" to 0.003", and wherein said layer of ferritic material has a wall thickness of about 0.004" to 0.008".

9. The composite fuel pin of claim 6, wherein said outer layer of stainless steel has a wall thickness of 0.007" to 0.021", and wherein said at least one layer of barrier material has a wall thickness of 0.005" to 0.008".

10. A composite fuel pin cladding for high density fuels which prevents liquid metal embrittlement thereof, said composite cladding consisting of an outer tube of austenitic stainless steel, and at least one inner tube constructed of barrier material for at least substantially eliminating embrittlement induced by the presence of a mixture of cesium and tellurium fission products and selected from the group of nickel and ferritic material, said inner tube being snugly fit within said outer tube.

11. The fuel pin cladding of claim 10, additionally including a second inner tube of barrier material positioned snugly within said one inner tube and constructed of material selected from the group consisting of nickel and ferretic material.

12. The fuel pin cladding of claim 11, wherein said one inner tube is constructed of ferritic material, and said second inner tube is constructed of nickel or a nickel-iron alloy.

13. The fuel pin cladding of claim 12, wherein said outer tube has a wall thickness of 0.007" to 0.021" and an outer diameter of 0.230" to 0.290", wherein said one inner tube has a wall thickness of 0.005" to 0.008", and wherein said second inner tube has a wall thickness of 0.001" to 0.003" and an inner diameter of 0.200" to 0.250".

14. The fuel pin cladding of claim 10, wherein said outer tube has an outer diameter of 0.230" to 0.290" and a wall thickness of 0.007" to 0.021", and wherein said one inner tube of barrier material has a wall thickness of 0.006" to 0.008" and an inner diameter of 0.200" to 0.250".

15. The fuel pin of claim 10, wherein said one inner tube consists of nickel or nickel-iron alloy.

16. The fuel pin of claim 10, wherein said one inner tube consists of ferritic material.

* * * * *